US006467220B1

(12) United States Patent
Hasse

(10) Patent No.: US 6,467,220 B1
(45) Date of Patent: Oct. 22, 2002

(54) DEVICE FOR FASTENING A LOCK MODULE ON A VEHICLE DOOR

(75) Inventor: Dirk Hasse, Alveslohe (DE)

(73) Assignee: Sommer Allibert-Lignotock GmbH, Worth am Rhein (DE)

(*) Notice: Subject to any disclaimer, the term of this patent is extended or adjusted under 35 U.S.C. 154(b) by 0 days.

(21) Appl. No.: 09/581,731

(22) PCT Filed: Dec. 21, 1998

(86) PCT No.: PCT/EP98/08584

§ 371 (c)(1), (2), (4) Date: Jun. 16, 2000

(87) PCT Pub. No.: WO99/32312

PCT Pub. Date: Jul. 1, 1999

(30) Foreign Application Priority Data

Dec. 27, 1997 (DE) .................................... 297 23 025 U

(51) Int. Cl.[7] .................................................. B60J 5/04
(52) U.S. Cl. ........................................................ 49/502
(58) Field of Search ................ 49/502, 503; 296/146.5, 296/146.7

(56) References Cited

U.S. PATENT DOCUMENTS

| | | | | | |
|---|---|---|---|---|---|
| 4,815,984 | A | * | 3/1989 | Sugiyama et al. | 49/502 X |
| 4,882,842 | A | * | 11/1989 | Basson et al. | 296/146.5 X |
| 4,943,109 | A | * | 7/1990 | Skrbina et al. | 296/146.5 X |
| 5,584,144 | A | * | 12/1996 | Hisano | 49/502 |
| 5,588,260 | A | * | 12/1996 | Suzuki et al. | 296/146.5 X |
| 5,716,044 | A | * | 2/1998 | Peterson et al. | 49/502 X |
| 5,946,858 | A | * | 9/1999 | Staser | 49/502 X |

* cited by examiner

*Primary Examiner*—Jerry Redman
(74) *Attorney, Agent, or Firm*—Barnes & Thornburg

(57) ABSTRACT

A device for fastening a lock module including at least one lock part, an actuating part, and a covering on a module support which is provided for a two-shelled vehicle door and supports the function modules of the vehicle door. A supporting arm which is elastic in a longitudinal direction, polydirectionally pliable, and thus capable of being readjusted, is fastened to the module support. The supporting arm fixes the lock module in the installation position in an unsupported and resilient manner via a supporting plate. The supporting arm is constructed with a tubular shape in order to accommodate a Bowden pull wire for the actuating part of the lock module and/or electric cable.

9 Claims, 3 Drawing Sheets

DEVICE FOR FASTENING A LOCK MODULE ON A VEHICLE DOOR

CROSS-REFERENCES TO RELATED APPLICATIONS

This application is a U.S. national application of international application serial No. PCT/EP98/08594 filed Dec. 21, 1998, which claims priority to German Serial No. 297 23 025.5 filed Dec. 22, 1997.

FIELD OF THE INVENTION

BACKGROUND AND SUMMARY OF THE INVENTION

Module supports for vehicle doors are increasingly being used in order to be able to insert pre-assembled subassemblies. As prior art, let DE 195 09 282 A1 be mentioned as representing a large number of documents, in which patent a module support—called support plate there—is described. Module supports on which the door lock is pre-assembled with the aid of a supporting arm are described for example in DE 195 11 105 C1. In this publication, reference is made to the problems of "threading in" those module parts which protrude beyond the module support. The door lock is in any case one of the modules which are difficult to handle during installation, and this not just in respect of "threading in" but also in respect of tolerance balancing. In the registered utility model DE 295 07 235—independently of a module support—a lock module is described in which the lock and the actuating unit for the outer handle are combined with the aid of a supporting element to form a single installation unit (a module therefore). In order to make possible tolerance balancing in respect of the installation assembly of lock and actuating unit, the U-shaped supporting element may be deformed plastically or elastically to a sufficient extent for a tolerance range, the tolerance between the lock and the actuating unit for the outer handle, disposed in the immediate vicinity, not being very big. Also, when a module support is used, it is expedient to combine all the lock and lock actuating members into one module, which is pre-assembled on the module support. In this case, not only does the threading in of the lock module between the inner and outer panels of the door have to be taken into account, but also the substantially larger tolerances which can occur between the module support and the door.

The purpose of the invention, therefore, is to quote a device for fastening a lock module on a module support, which makes pre-assembly possible in such a way that in the final assembly of the module support on the vehicle door, the lock module may be easily brought to its place of installation and fixed there, and that any possibly necessary tolerance balancing between the module support and the door lock can be undertaken without extra assembly outlay.

Because there is attached to the module support a supporting arm which is elastic in a longitudinal direction and flexible in all directions, and capable of being readjusted, and which fixes the lock module in the installation position in an unsupported and resilient manner via a supporting plate, the final assembly of the fitted module support does not present any difficulties. The lock module, projecting beyond the module support can, because of the flexibility of the supporting arm be threaded in "round the corner", so to speak. Expensive pivoting and rotating movements of the whole module support are dispensed with. The readjustability of the supporting arm guarantees the installation position of the lock module after it has been threaded in. Tolerances occurring balance one another through bending and/or longitudinal elasticity of the supporting arm within a wide range. If the supporting arm is configured tubular, it can in addition be a protective and guide sleeve for the Bowden pull wire for actuating the lock.

The supporting arm is expediently able to be fitted separately. An advantageous structure arises if it is designed as a hollow shaped part—for example as a thermoplastic blow-moulded part—which, to fasten the lock module, has an approximately spherically formed connection region. In this way, position corrections of the lock module during pre-assembly are possible in all directions, since the spherically shaped connection region acts like a ball and socket joint. Communicating with this connection region is an approximately cylindrically shaped region which predetermines the spacing from and the alignment with the module support. Longitudinal elasticity and flexibility in all directions with complete readjustment capability are here substantially ensured by ring-folding on the base region of the cylindrical hollow shaped part. This region, which also has the fastening flange for pre-assembling the supporting arm on the module support, is thus shaped similarly to bellows. The supporting arm can here be fastened by gluing to the module support, but snap connections are also possible. To this end, the hollow shaped part can have moulded-on snap-in lugs. It is particularly advantageous if the supporting arm engages through the module support from the dry side to the "wet side" of the door body in a sealed manner, and if the exit of the Bowden pull wire for actuating the lock and/or the electrical cable is sealed on the lock side against the entry of moisture, for example by foaming the spherical connection region.

However, the supporting arm can also have a cross-section which is open at the side, for example in a U shape. This has the advantage that the Bowden pull wire for actuating the lock and electrical cables can be very easily inserted even subsequently. The open U-profile can be closed by a likewise U-shaped complementary section, which can be placed on in any manner, for example by clipping or gluing.

After the insertion of Bowden pull wire and cables, the open U-profile of the supporting arm can also be closed by it first of all being elastically bent up to insert these elements, then sprung back and finally secured by a moulded-on, linear snap connection. Instead of the linear snap connection, connection points, for example press studs or through fasteners can be used which likewise can be moulded on. In particular, a pointed oval cross-section of the supporting arm favours a design of this type. In addition to this, there arises the additional advantage that the supporting arm offers fewer engagement surfaces to break-in tools, and that sliding down sideways of these tools is aided.

A supporting arm with an open cross-section can be expediently fastened to the module support also by being clipped in. This enables assembly time to be saved. The geometry of such a clip connection can be so configured that displacement of the supporting arm in a longitudinal direction, i.e. in the direction of travel, is possible, but not rotation around the fastening region. The possibility for tolerance balancing and mobility as the module support is fitted into the door is thus improved and thus installation is simplified and made easier. If the module support is so designed that branching from the supporting member is expedient separately for Bowden pull wire and cables, the supporting arm can have at least one branch socket for this purpose.

Supporting arms with a U-shaped or pointed oval cross-section are also expediently produced from thermoplastic materials. Injection-moulding and blow-moulding processes offer all the possible ways of realising supporting arms according to the invention, if necessary combined with additional stamping and/or milling processes. Film hinges and linear or point connection regions can also be produced in one production step, preferably as snap connections.

BRIEF DESCRIPTION OF THE DRAWINGS

The invention will now be explained more fully and described with the aid of an embodiment shown in FIGS. 1 to 7. These show.

DETAILED DESCRIPTION OF ILLUSTRATIVE EMBODIMENTS

Figure 1:
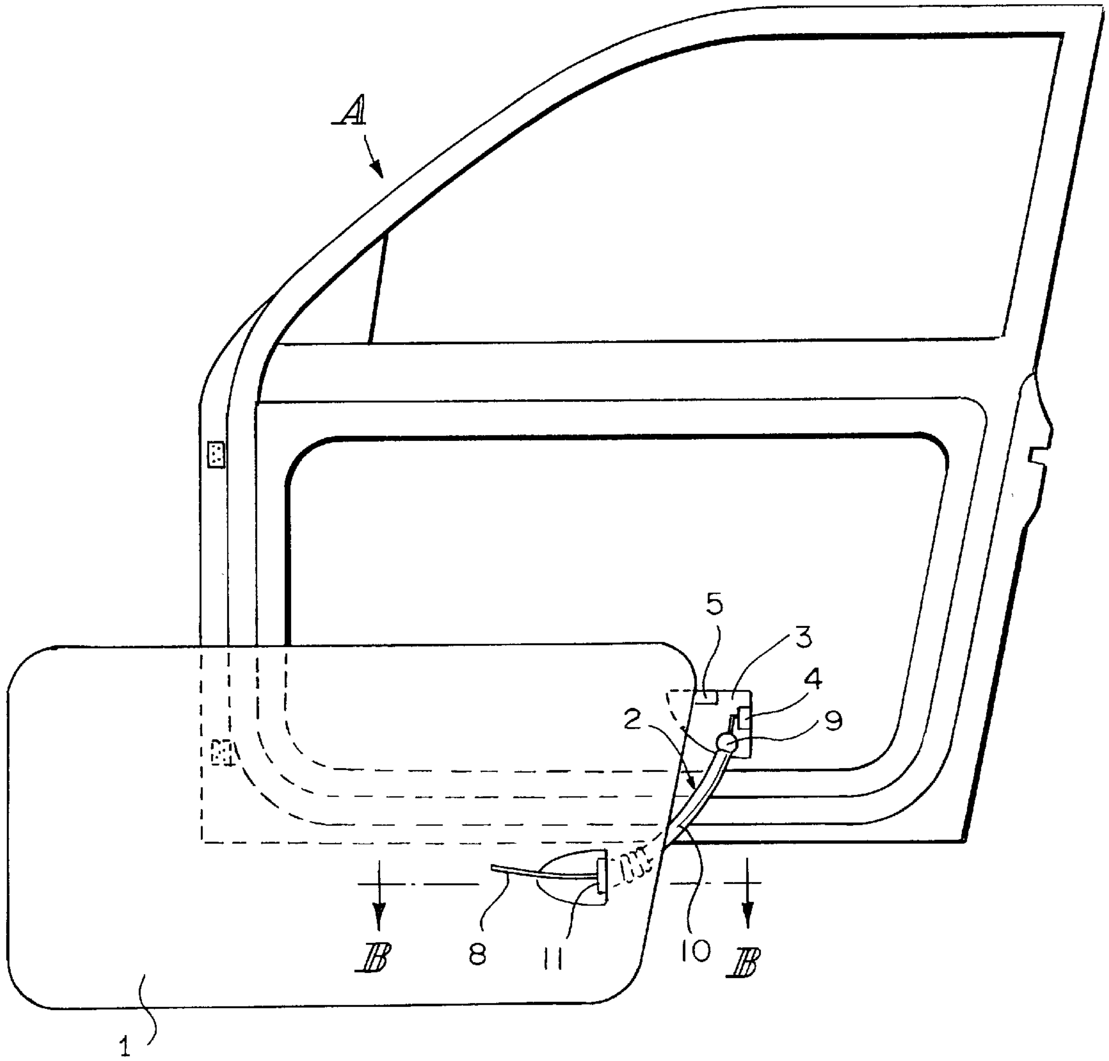
FIG. 1 in a schematic representation, the allocation of module support, supporting arm, lock module and door structure, FIG. 2 the lock module in schematic side view, FIG. 3 the lock module in schematic front elevation, FIG. 4 a supporting arm, configured as a blow-moulded part, and finally, FIG. 5 with the aid of section B./.B in FIG. 1 the possible ways of securing the supporting arm in the blow-moulded design, FIG. 6 a supporting arm with a U-shaped cross-section and its fastening on the module support, shown in a perspective partial view and FIG. 7 a schematic section through a supporting arm with a pointed oval cross-section.

In FIG. 1, the two-shelled panel structure of the door is referred to as A. A module support 1 is represented schematically as an outline; all the function modules apart from the lock module are not represented, for the sake of clarity. To the module support 1 is fastened a supporting arm called 2, with the aid of a flange 11. A cylindrical portion 10 of the supporting arm 2 here determines the installation position of the lock module formed from a support plate 3, a lock part 4 and an external actuating part 5. The lock module is fastened to the supporting arm 2 by means of a spherical head 9 so as to be capable of alignment. A Bowden pull wire 8 for actuating the lock is guided and protected in the supporting arm 2.

Figure 2:
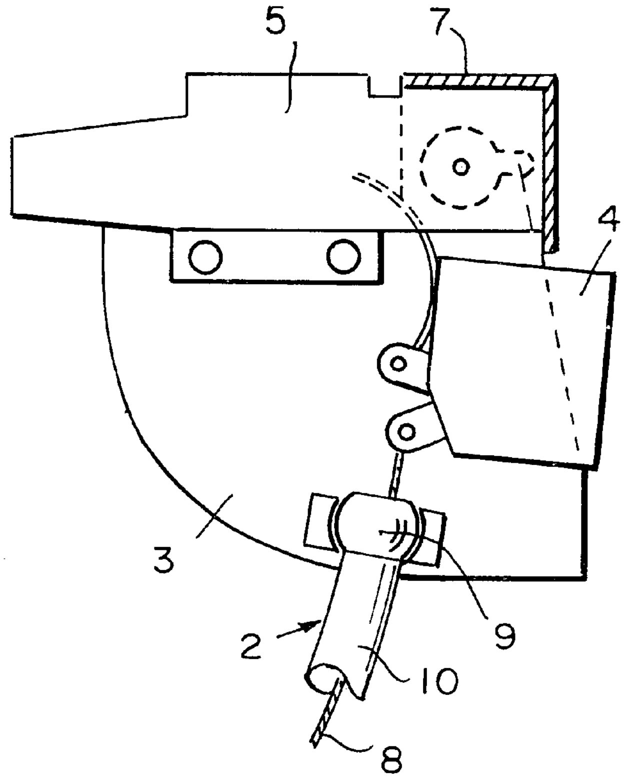
Figure 3:
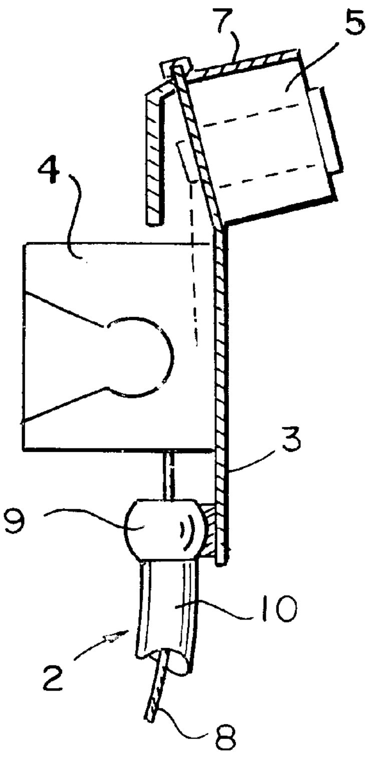
Figure 4:
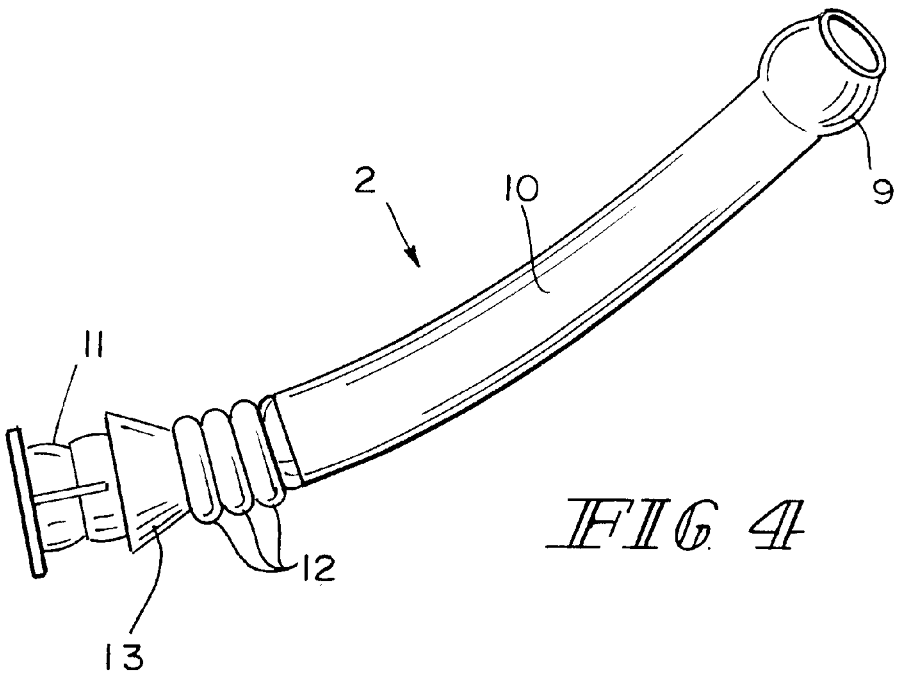
Figure 5:
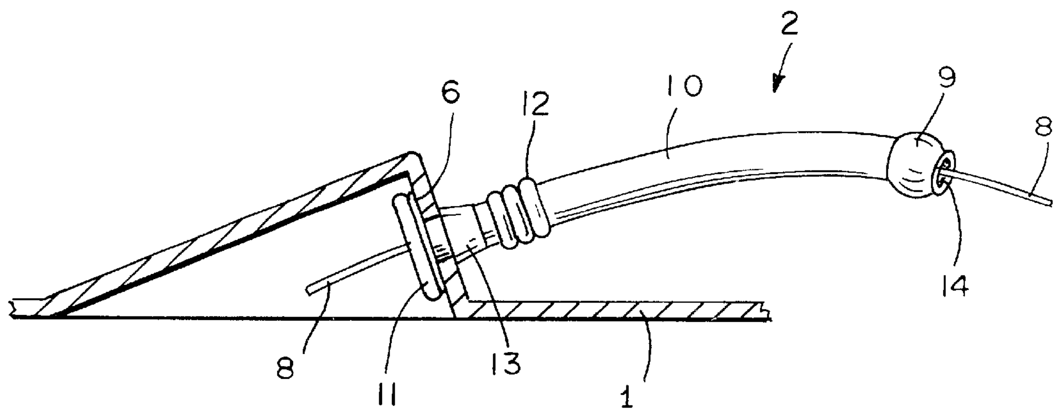

FIG. 2 shows the lock module in side view, and FIG. 3 the latter in a front view. A covering 7 secures the actuating and locking rods (indicated in FIG. 3 in dotted lines) against unauthorised intervention from outside. The supporting arm 2 realised as a blow-moulded part is explained in FIG. 4. Communicating with the spherical head 9 for adjustable connection of the lock module is an approximately cylindrical shank 10, which through its length and curvature pre-determines the installation position of the lock module. Flexibility and longitudinal elasticity of the supporting arm 2 are pre-determined predominantly by the ring-fold region 12. With the aid of the flanged 11 and a snap-in lug 13, the supporting arm 2 may be secured in an opening of the module support 1, as FIG. 5 explains. Seal 6 here prevents moisture from escaping on flange 11 of the supporting arm 2, and the foam 14 of the spherical head 9 seals the exit of the Bowden pull wire 8 in a resilient manner.

Figure 6:
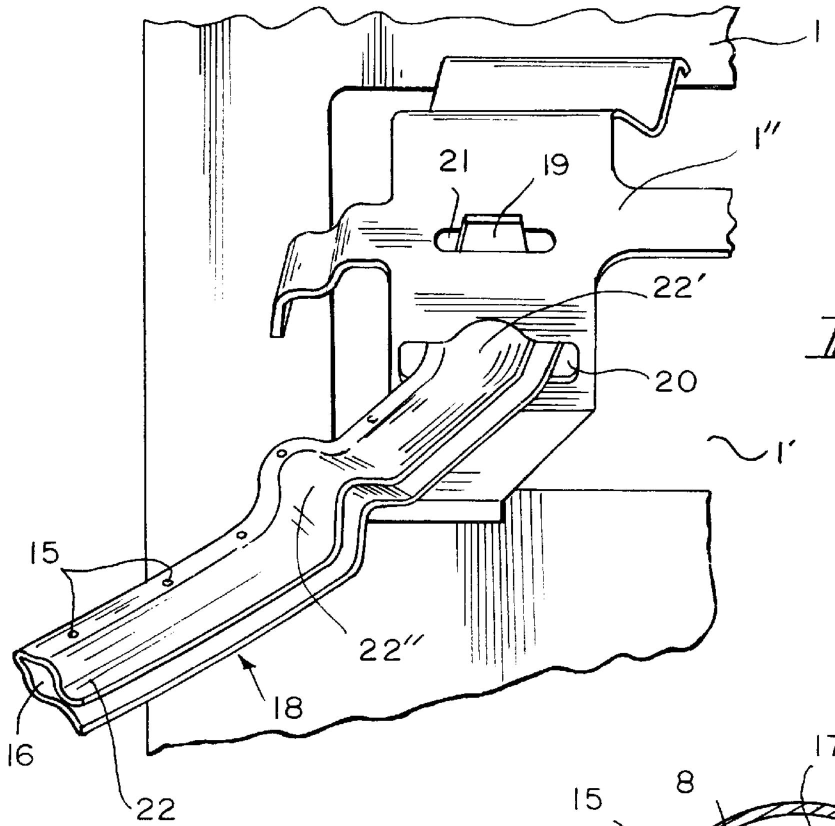
Figure 7:
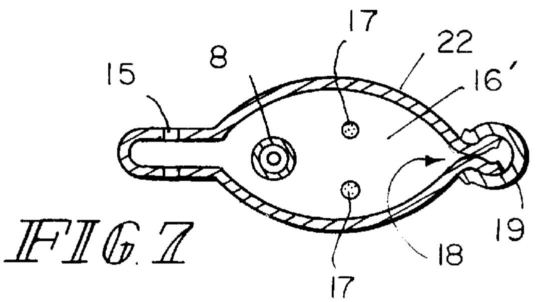

In FIG. 6 the module support, shown in section, is again referred to as 1. The supporting arm 22 with the open cross-section 16 is secured to the module support 1 with the aid of a support bridge 1", which bridges over a cut-out 1', necessary e.g. for other constructional reasons, in the support module 1. Here the supporting arm 22 is guided with its angled portion 22' first of all through a guide slot 20 in the support bridge 1", and then locked with a snap-in lug 19 into a snap-in slot 21 in the support bridge 1". Guide slot and snap-in slot 21 here allow—as shown—limited longitudinal displacement of the supporting arm 22. The lock module (FIG. 2) is not shown here; it is secured with the aid of screw holes 15 to the supporting arm 22. The open side 18 of the supporting arm 22 makes it possible to introduce the Bowden pull wire 8 and/or cable 17 subsequently into the cross-section 16, simple installation being ensured by snapping in between the resilient legs of the supporting arm 22. An offset of the supporting arm 22 ensures increased resilience in its longitudinal direction which can if necessary be further improved by a bellows zones being arranged here (in a similar way to zone 12 in FIG. 4). According to the requirements of the particular application, the supporting arms 2 or 22 can be directed obliquely upwards, (FIG. 1), or be directed obliquely downwards (FIG. 6). Finally, FIG. 7 explains the approximately pointed oval cross-section 16' of a supporting arm 22, which is closed by the U-shaped complementary moulding 19; and specifically by being snapped in resiliently.

Prior art offers a large number of realisation variants of the inventive idea; specifically both in respect of suitable materials such as thermoplasts, and also in respect of expedient manufacturing methods which are not specified in detail.

I claim:

1. A device for fastening a lock module, comprising at least one lock part, its actuating part and a covering, to a module support for a two-shelled vehicle door, which carries function modules of the vehicle door, wherein there is fastened to the module support a supporting arm which is elastic in a longitudinal direction and flexible in all directions, and capable of being readjusted, and which fixes the lock module in an installation position in an unsupported and resilient manner via a supporting plate, the supporting arm engaging through the module support in a sealed manner and, on a lock side, an exit of an actuating Bowden pull wire and/or the electrical cable is sealed against moisture.

2. A device for fastening a lock module, comprising at least one lock part, its actuating part and a covering, to a module support for a two-shelled vehicle door, which carries function modules of the vehicle door, wherein there is fastened to the module support a supporting arm which is elastic in a longitudinal direction and flexible in all directions, and capable of being readjusted, and which fixes the lock module in an installation position in an unsupported and resilient manner via a supporting plate, the supporting arm having an open, substantially U-shaped cross-section into which a Bowden pull wire for actuating the lock part and/or electrical cables may be inserted.

3. The device according to claim 2, wherein the open, U-shaped cross-section of the supporting arm may be closed by a supplementary molding which overlaps an open side of the supporting arm and is also U-shaped.

4. The device accordions to claim 2, wherein the open cross-section of the supporting arm may be bent up to insert the Bowden pull wire for actuating the lock part and/or the electrical cables, and the latter may be fixed, after being inserted, by springing back in the supporting arm.

5. The device according to claim 2, wherein the cross-section of the supporting arm is substantially a pointed oval open on one side.

6. The device according to claim 2, wherein an open side of the supporting arm may be closed by at least one snap connection.

7. The device according to claim 2, wherein the supporting arm may be fastened to the module support by being clipped in.

8. The device according to claim 7, wherein the geometry of a clip connection with which the supporting arm is fastened to the module support allows displacement of the supporting arm in its longitudinal direction but does not allow rotation around a fastening region.

9. A device for fastening a lock module, comprising at least one lock part, its actuating part and a covering, to a module support for a two-shelled vehicle door, which carries function modules of the vehicle door, wherein there is fastened to the module support a supporting arm which is elastic in a longitudinal direction and flexible in all directions, and capable of being readjusted, and which fixes the lock module in an installation position in an unsupported and resilient manner via a supporting plate, wherein the supporting arm has at least one branch socket through which at least one electrical cable can be led out separately.

* * * * *